US010714978B2

United States Patent
Choi et al.

(10) Patent No.: US 10,714,978 B2
(45) Date of Patent: Jul. 14, 2020

(54) WIRELESS POWER TRANSMISSION APPARATUS THAT IS TURNED OFF IN STANDBY STATE AND ELECTRONIC APPARATUS INCLUDING WIRELESS POWER TRANSMISSION APPARATUS

(71) Applicant: SAMSUNG ELECTRONICS CO., LTD., Suwon-si (KR)

(72) Inventors: Shin Wook Choi, Suwon-si (KR); Jeong Il Kang, Yongin-si (KR); Du Hee Jang, Suwon-si (KR); Seong Hoon Woo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 33 days.

(21) Appl. No.: 15/968,417

(22) Filed: May 1, 2018

(65) Prior Publication Data
US 2018/0323650 A1    Nov. 8, 2018

(30) Foreign Application Priority Data

May 2, 2017    (KR) .................. 10-2017-0056436

(51) Int. Cl.
*H02J 50/12*    (2016.01)
*H02J 50/80*    (2016.01)

(52) U.S. Cl.
CPC .............. *H02J 50/12* (2016.02); *H02J 50/80* (2016.02)

(58) Field of Classification Search
CPC .. H02J 50/12; H02J 50/80; H02J 17/00; H02J 5/005; H01F 38/14

(Continued)

(56) References Cited

U.S. PATENT DOCUMENTS 6,535,239 B1 *  3/2003  Kim .................. H04N 7/141
                                              348/14.02
6,946,950 B1 *  9/2005  Ueno ................ G06K 7/0008
                                              340/10.1

(Continued)

FOREIGN PATENT DOCUMENTS

EP       2822141 A2     1/2015
WO    2016/195218 A1    12/2016

OTHER PUBLICATIONS

Communication dated Sep. 11, 2018 issued by the International Searching Authority in Counterpart Application No. PCT/KR2018/004722 (PCT/ISA/220, PCT/ISA/210, and PCT/ISA/237).

(Continued)

*Primary Examiner* — Alfonso Perez Borroto
(74) *Attorney, Agent, or Firm* — Sughrue Mion, PLLC

(57) ABSTRACT

An electronic apparatus is disclosed. The electronic apparatus includes a wireless power transmission module that wirelessly transmits power to a wireless power reception apparatus that is configured to supply power to a drive apparatus for an operation of an electronic apparatus, a first signal reception module that receives a control signal from a remote control apparatus, a first power supply module that supplies power to the first signal reception module, and a first control module configured to control the first power supply module. When the first signal reception module receives an off signal, the first control module controls the first power supply module such that power that is supplied to the wireless power transmission module is blocked.

20 Claims, 10 Drawing Sheets

(58) Field of Classification Search
USPC .......................................................... 307/104
See application file for complete search history.

(56) References Cited

U.S. PATENT DOCUMENTS

| | | | | |
|---|---|---|---|---|
| 7,573,438 | B2* | 8/2009 | Nohara | .................. G06F 3/1438 |
| | | | | 345/1.1 |
| 8,101,898 | B2* | 1/2012 | Koste | .................. H03K 17/941 |
| | | | | 136/244 |
| 8,908,400 | B2* | 12/2014 | Lisi | ........................ H02J 50/12 |
| | | | | 363/61 |
| 9,125,280 | B2 | 9/2015 | Lee et al. | |
| 9,520,749 | B2 | 12/2016 | Kim et al. | |
| 9,698,628 | B2 | 7/2017 | Cain et al. | |
| 9,997,317 | B2* | 6/2018 | Liu | ........................ H01H 47/02 |
| 10,186,911 | B2* | 1/2019 | Leabman | ................. H02J 50/80 |
| 10,389,183 | B2* | 8/2019 | Han | ..................... H04B 5/0093 |
| 10,505,396 | B2* | 12/2019 | Iwasaki | .................. H02J 50/80 |
| 2013/0038126 | A1 | 2/2013 | Wang et al. | |
| 2013/0154381 | A1 | 6/2013 | Cain et al. | |
| 2013/0271187 | A1* | 10/2013 | Hayashi | ............... H03K 17/063 |
| | | | | 327/109 |
| 2014/0117869 | A1 | 5/2014 | Lee et al. | |
| 2014/0197687 | A1 | 7/2014 | Lin | |
| 2015/0008876 | A1 | 1/2015 | Kwak et al. | |
| 2015/0042167 | A1 | 2/2015 | Kim et al. | |

OTHER PUBLICATIONS

Communication dated Sep. 30, 2019, issued by the European Patent Office in counterpart European Application No. 18795174.4.

* cited by examiner

WIRELESS POWER TRANSMISSION APPARATUS THAT IS TURNED OFF IN STANDBY STATE AND ELECTRONIC APPARATUS INCLUDING WIRELESS POWER TRANSMISSION APPARATUS

CROSS-REFERENCE TO RELATED APPLICATION(S)

This application is based on and claims priority under 35 U.S.C. § 119 from Korean Patent Application No. 10-2017-0056436, filed on May 2, 2017, in the Korean Intellectual Property Office, the disclosure of which is incorporated herein by reference in its entirety.

BACKGROUND

1. Field

The present disclosure relates to an electronic apparatus that includes a wireless power transmission and reception apparatus.

2. Description of Related Art

An electronic apparatus may include a wireless power transmission and reception apparatus that is configured to supply power to the electronic apparatus wirelessly. The wireless power transmission and reception apparatus may transmit power from a wireless power transmission apparatus connected with a power source to a wireless power reception apparatus that is connected with a drive component of the electronic apparatus. An apparatus that transmits and receives power wirelessly may include a resonator, and may wirelessly transmit and receive power by implementing resonant coupling via the resonator.

In the wireless power transmission and reception apparatus, the efficiency of transmitted/received power may vary based on a distance between a wireless power transmission apparatus and a wireless power reception apparatus. Further, although the distance between the wireless power transmission apparatus and the wireless power reception apparatus may be uniform, the impedance of load may vary based on an on/off state of the drive component of the electronic apparatus connected to the wireless power reception apparatus, thereby causing a change of an impedance matching condition. This may mean that the efficiency of transmitted/received power varies. As such, the development of technologies for the wireless power transmission and reception apparatus is focused on a method for improving the efficiency of transmitted/received power.

The above information is presented as background information only to assist with an understanding of the present disclosure. No determination has been made, and no assertion is made, as to whether any of the above might be applicable as prior art with regard to the present disclosure.

SUMMARY

In an electronic apparatus that includes a wireless power transmission and reception apparatus, in the case where a control signal reception unit that receives a control signal for changing an on/off state of the electronic apparatus is included in a wireless power reception apparatus, in order to receive a control signal for switching from an off state (or a standby state) to an on state, the electronic apparatus should enable a wireless power transmission apparatus, as well as the wireless power reception apparatus connected with the control signal reception unit, to maintain an active state. As such, the electronic apparatus may consume a relatively large quantity of power compared with an electronic apparatus that transmits power via a wired connection in an off state.

Aspects of the present disclosure are designed to address at least the above-mentioned problems and/or disadvantages and to provide at least the advantages described below. Accordingly, an aspect of the present disclosure is to reduce power consumption by turning off a wireless power transmission apparatus when an electronic apparatus is in an off state.

In accordance with an aspect of the present disclosure, a wireless power transmission apparatus may include a wireless power transmission module that wirelessly transmits a first power to a wireless power reception apparatus that is configured to supply a second power to a drive apparatus for an operation of an electronic apparatus, a first signal reception module that receives a control signal from a remote control apparatus, a first power supply module that supplies a third power to the first signal reception module, and a first control module configured to control the first power supply module. When the first signal reception module receives a power off signal, the first control module may control the first power supply module such that a fourth power that is supplied to the wireless power transmission module is blocked.

In accordance with another aspect of the present disclosure, an electronic apparatus may include a wireless power transmitter that includes a wireless power transmission module that wirelessly transmits a first power, a first signal reception module that receives a control signal from a remote control apparatus, a first power supply module that supplies a second power to the first signal reception module, and a first control module that controls the first power supply module, and a wireless power receiver that wirelessly receives a third power from the wireless power transmitter and operates a drive module that is configured for driving of the electronic apparatus. When the first signal reception module receives a power off signal, the first control module may control the first power supply module such that a fourth power that is supplied to the wireless power transmission module is blocked.

According to embodiments, an electronic apparatus may include a signal reception module, which receives a control signal from a remote control apparatus, in a wireless power transmitter as well as a wireless power receiver and may turn off some components of the wireless power transmitter when the electronic apparatus is in an off state (or a standby state), thereby reducing power consumption of an apparatus, which wirelessly transmits power supplied from an external power source to a drive module, in the standby state.

Further, when an overvoltage is applied to the wireless power transmitter, the wireless power receiver, and the drive module due to an abnormal operation of the electronic apparatus, the wireless power transmitter may be turned off, thereby preventing the electronic apparatus from being out of order.

In addition, a variety of effects which may be directly or indirectly understood through this disclosure may be provided.

Other aspects, advantages, and salient features of the disclosure will become apparent to persons having ordinary in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3A is a block diagram illustrating a state in which an electronic apparatus according to an embodiment is turned on;

DETAILED DESCRIPTION

Figure 1:
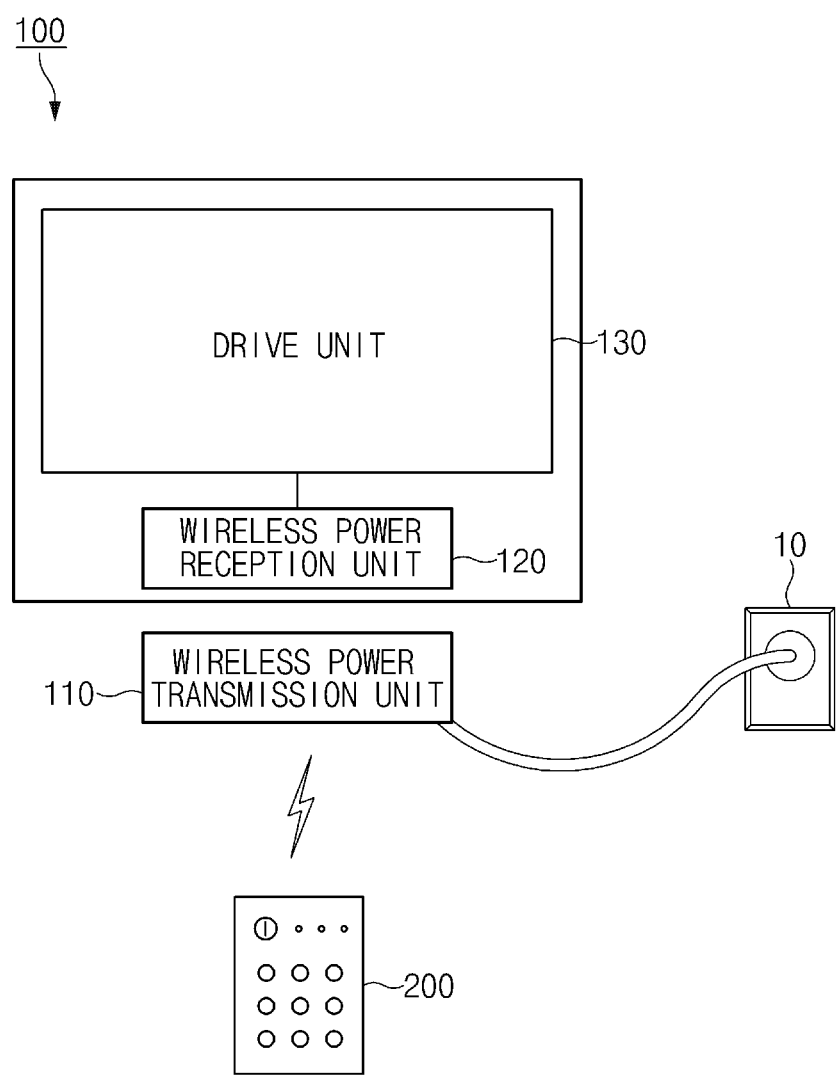
FIG. 1 is a view illustrating an electronic apparatus and a remote control apparatus, according to various embodiments.

Hereinafter, various embodiments of the present disclosure will be described with reference to accompanying drawings. However, persons having ordinary skill in the art will recognize that modification, equivalent, and/or alternative on the various embodiments described herein can be variously made without departing from the scope and spirit of the present inventive concept. With regard to description of drawings, similar elements may be marked by similar reference numerals.

FIG. 1 is a view illustrating an electronic apparatus and a remote control apparatus, according to various embodiments.

Referring to FIG. 1, an electronic apparatus 100 may include a display apparatus that may display an image. The electronic apparatus 100 may include a display, and may display an image stored in a memory or an image received from an external electronic apparatus, in the display. For example, the electronic apparatus 100 may be an electronic apparatus which includes a display, such as any of a television (TV), a monitor of a personal computer (PC), an electronic picture frame, or the like.

According to an embodiment, the electronic apparatus 100 may be supplied with power for the purpose of displaying an image in the display. For example, the electronic apparatus 100 may be supplied with the power from an external power source (e.g., a wall power source) 10. The power supplied from the external power source 10 may be, for example, alternating current (AC) power. The electronic apparatus 100 may convert the supplied AC power to direct current (DC) power and may supply the DC power to respective components of the electronic apparatus 100.

The electronic apparatus 100 may include a wireless power transmission unit (also referred to herein as a "wireless power transmitter") 110, a wireless power reception unit (also referred to herein as a "wireless power receiver") 120, and a drive unit (also referred to herein as a "drive module" or a "drive component") 130. The electronic apparatus 100 may receive a control signal for controlling the wireless power transmission unit 110, the wireless power reception unit 120, and the drive unit 130 from a remote control apparatus 200.

According to an embodiment, the wireless power transmission unit 110 may transmit the power to the wireless power reception unit 120. For example, the wireless power transmission unit 110 may wirelessly transmit the power to the wireless power reception unit 120 without a need for a connection with a leading wire.

According to an embodiment, the wireless power reception unit 120 may receive the power from the wireless power transmission unit 110. For example, the wireless power reception unit 120 may wirelessly receive the power from the wireless power transmission unit 110 without a connection with a leading wire. According to an embodiment, the wireless power reception unit 120 may supply at least a portion of the power received from the wireless power transmission unit 110 to the drive unit 130.

According to an embodiment, the drive unit 130 may be supplied with the power for applying a current (or a voltage) to each component of the display, from the wireless power reception unit 120. For example, the drive unit 130 may be supplied with the power from the wireless power reception unit 120 via a leading wire.

According to an embodiment, the drive unit 130 may include a component(s) that is configured for driving the display. For example, the drive unit 130 may include a panel driving circuit and a control circuit. The panel driving circuit may apply a current to a display panel (e.g., a liquid crystal display (LCD) panel, a plasma display panel (PDP) panel, or a light emitting diode (LED) panel) in response to a control signal provided from the control circuit, for example. The control circuit may generate a control signal that corresponds to an image to be displayed in the display and may apply a current to the panel driving circuit based on the generated control signal. Further, the drive unit 130 may further include a backlight driving circuit for driving a backlight, in the case where the display panel is the LCD panel. The backlight driving circuit may apply, to the back light, a voltage for operating the backlight.

The remote control apparatus 200 may directly receive a user input, and may transmit a control signal that corresponds to the user input to the electronic apparatus 100. For example, the remote control apparatus 200 may transmit, to the electronic apparatus 100, a control signal for turning on or off the electronic apparatus 100. The remote control apparatus 200 may transmit a control signal to the electronic apparatus 100 via a short range wireless communication interface such as any of Bluetooth, near field communication (NFC), an infrared (IR) transceiver, or the like.

According to an embodiment, the electronic apparatus 100 may perform an operation that corresponds to the control signal received from the remote control apparatus 200. For example, the electronic apparatus 100 may receive an on/off signal from the remote control apparatus 200 and may enter an on state or an off state (or a standby state). According to an embodiment, the electronic apparatus 100 may receive an on signal from the remote control apparatus 200 while in the off state. For example, the electronic apparatus 100 may operate in a state where power is supplied only to a component (e.g., a control signal reception module) that receives a control signal from the remote control apparatus 200 and enters the on state.

In the case where an apparatus for receiving a signal from the remote control apparatus 200 is connected to the wireless power reception unit 120, in order to receive the on signal from the remote control apparatus 200, the electronic apparatus 100 should enable the wireless power transmission unit 110 as well as the wireless power reception unit 120 to maintain an active state. As such, when the electronic apparatus 100 is in the standby state, the electronic apparatus 100 may consume a relatively large quantity of power compared with an electronic apparatus supplying power via a wired connection. The electronic apparatus 100 according to various embodiments of the present disclosure may turn off some components of the wireless power transmission unit 110, and the wireless power reception unit 120 in the standby state, thus reducing power consumption.

Figure 2:
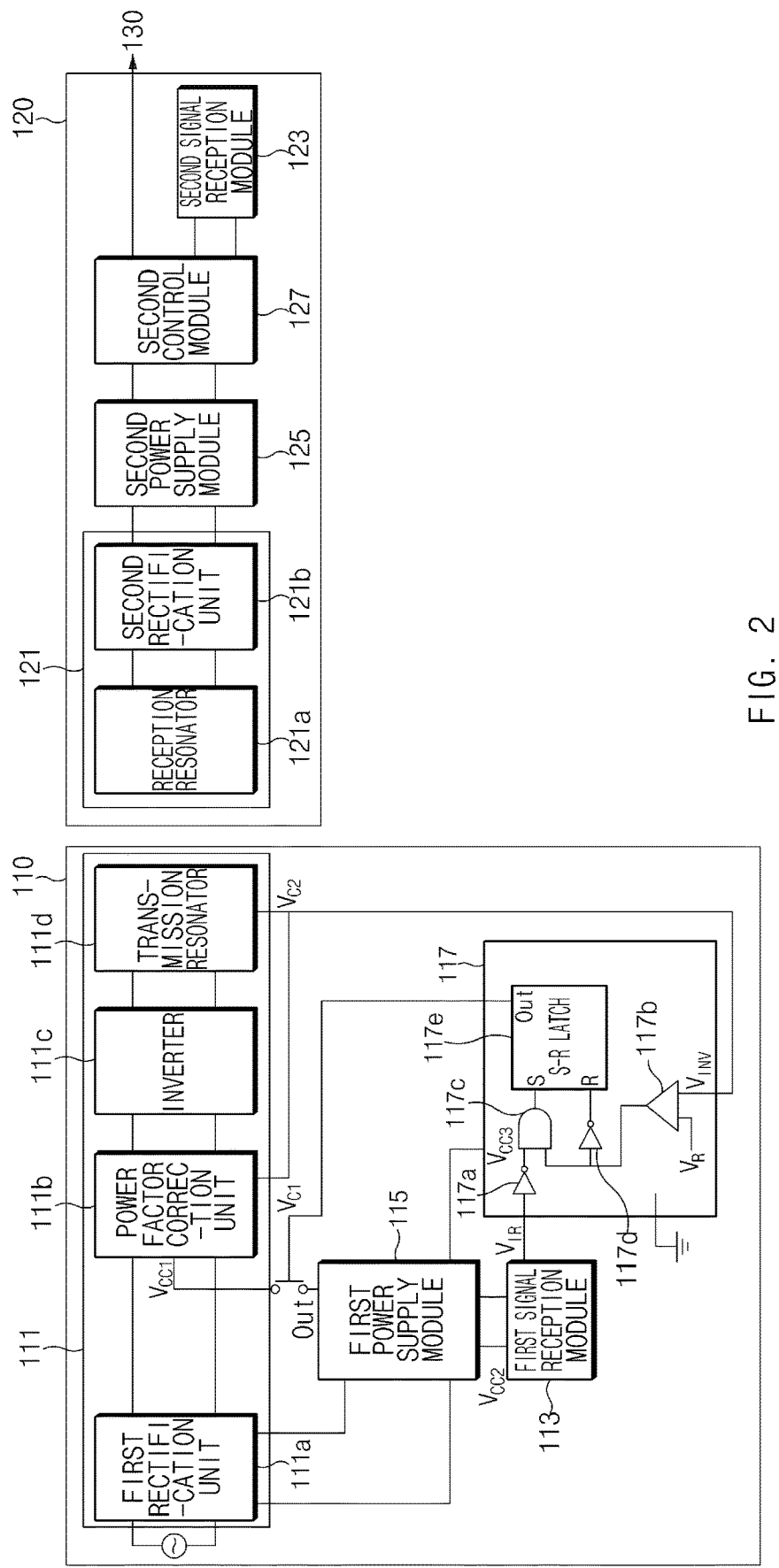
FIG. 2 is a block diagram illustrating a configuration of a wireless power transmission module and a wireless power reception module of an electronic apparatus, according to an embodiment.

FIG. 2 is a block diagram illustrating a configuration of a wireless power transmission module and a wireless power reception module of an electronic apparatus, according to an embodiment.

Referring to FIG. 2, the wireless power transmission unit 110 may include a wireless power transmission module 111, a first signal reception module 113, a first power supply module 115, and a first control module 117.

The wireless power transmission module 111 may wirelessly transmit power to the wireless power reception unit (or a wireless power reception apparatus) 120. The wireless power transmission module 111 may include a first rectification unit (also referred to herein as a "first rectifier") 111a, a power factor correction (PFC) unit (also referred to herein as a "power factor corrector") 111b, an inverter 111c, and a transmission resonator 111d.

According to an embodiment, the first rectification unit 111a may convert AC power received from an external power source to DC power. For example, the first rectification unit 111a may include a rectification circuit that is configured for rectifying the AC power. The rectification circuit may be a bridge circuit (e.g., a diode bridge circuit) that rectifies the received AC power in order to convert the AC power to the DC power.

According to an embodiment, the power factor correction unit 111b may adjust the power factor of the DC power received from the first rectification unit 111a and may output a DC voltage. The power factor correction unit 111b may output the DC voltage via a capacitor (or a smoothing capacitor) connected to an output terminal. According to an embodiment, the power factor correction unit 111b may be turned on or off. When the power factor correction unit 111b is turned on, the power factor correction unit 111b may adjust the power factor of the DC power in order to output the DC voltage; when the power factor correction unit 111b is turned off, the power factor correction unit 111b may not output the DC voltage.

According to an embodiment, the inverter 111c may convert the DC voltage input from the power factor correction unit 111b to an AC voltage and may generate power to be transmitted to the wireless power reception unit 120. According to an embodiment, the inverter 111c may include a power amplifier that amplifies the generated voltage, and may amplify power that is output via the power amplifier.

According to an embodiment, the transmission resonator 111d may transmit the AC power received from the inverter 111c to the wireless power reception unit 120. For example, the transmission resonator 111d may be a resonant circuit that has a predetermined resonant frequency. The resonant circuit may include an inductor and a capacitor. The transmission resonator 111d may generate electromagnetic energy via the resonant circuit by using the AC power and may transfer the electromagnetic energy to a resonant circuit of the wireless power reception unit 120. In this manner, the transmission resonator 111d may transmit power to the wireless power reception unit 120.

The first signal reception module 113 may receive a control signal from the remote control apparatus 200. For example, the first signal reception module 113 may receive a control signal from the remote control apparatus 200. According to an embodiment, when receiving the control signal, the first signal reception module 113 may output a voltage $V_{IR}$ that corresponds to the control signal to the first control module 117. For example, when receiving the control signal, the first signal reception module 113 may change a signal, which is output during a specified time, from a signal of a high level to a signal of a low level.

The first power supply module 115 may supply the DC power from the first rectification unit 111a to respective components of the wireless power transmission unit 110. For example, the first power supply module 115 may supply power (or apply a voltage $V_{CC1}$) to the power factor correction unit 111b. A connection for supplying power to the power factor correction unit 111b may be "on" or "off". The first power supply module 115 may supply power (or apply a voltage $V_{CC2}$) to the first signal reception module 113. The first power supply module 115 may supply power (or apply a voltage $V_{CC3}$) to the first control module 117.

The first control module 117 may control the first power supply module 115. For example, the first control module 117 may control power that is output from the first power supply module 115 to the power factor correction unit 111b.

According to an embodiment, the first control module 117 may receive an output of the wireless power transmission module 111 and an output of the first signal reception module 113 as inputs for the purpose of controlling the first power supply module 115. The output of the wireless power transmission module 111 may include, for example, a voltage $V_{C1}$ of a capacitor in the power factor correction unit 111b and a voltage $V_{C2}$ of a capacitor in the transmission resonator 111d. According to an embodiment, the first control module 117 may include an integrated circuit (IC) that receives the outputs. For example, the first control module 117 may include a first NOT gate 117a, a comparator 117b, an AND gate 117c, a second NOT gate 117d, and an S-R latch 117e. An input of the first NOT gate 117a may be connected to an output of the first signal reception module 113. Inputs of the comparator 117b may be connected to an output $V_{INV}$ of the wireless power transmission module 111 and a predetermined voltage value $V_R$. Inputs of the AND gate 117c may be connected to an output of the first NOT gate 117a and an output of the comparator 117b. An input of the second NOT gate 117a may be connected to the output of the comparator 117b. An input "S" of the S-R latch 117e may be connected to an output of the AND gate 117c, and an input "R" of the S-R latch 117e may be connected to an output of the second NOT gate 117d. The predetermined voltage value $V_R$ may be, for example, the voltage $V_{CC3}$ that the first power supply module 115 applies to the first control module 117.

As such, when the first signal reception module 113 receives a power off signal, the first control module 117 may control the first power supply module 115 such that power that is supplied to the wireless power transmission module 111 is blocked. Further, when the first signal reception module 113 receives a power on signal, the first control module 117 may control the first power supply module 115 such that power is supplied to the wireless power transmission module 111.

The wireless power reception unit 120 may wirelessly receive power from the wireless power transmission unit 110 in order to operate the drive unit 130 for an operation of the electronic apparatus 100. The wireless power reception unit 120 may include a wireless power reception module 121, a second signal reception module 123, a second power supply module 125, and a second control module 127.

The wireless power reception module 121 may wirelessly receive power from the wireless power transmission unit 110. The wireless power reception module 121 may include a reception resonator 121a and a second rectification unit (also referred to herein as a "second rectifier") 121b.

According to an embodiment, the reception resonator 121a may receive AC power from the wireless power transmission unit 110. For example, the reception resonator 121a may be a resonant circuit that has a predetermined resonant frequency. The resonant circuit may include an inductor and a capacitor. The reception resonator 121a may receive the electromagnetic energy generated by the resonator of the wireless power transmission unit 110 via the resonant circuit and may generate AC power by using the electromagnetic energy.

According to an embodiment, the second rectification unit 121b may convert the AC power received from the wireless power transmission unit 110 to DC power. The second rectification unit 121b may be similar to the first rectification unit 111a of the wireless power transmission unit 110. For example, the second rectification unit 111a may include a rectification circuit that is configured for rectifying the AC power.

The second signal reception module 123 may receive a control signal from the remote control apparatus 200. For example, the second signal reception module 123 may receive a control signal from the remote control apparatus 200. According to an embodiment, when receiving the control signal, the second signal reception module 123 may output a signal that corresponds to the received control signal to the second control module 127.

The second power supply module 125 may supply DC power from the wireless power reception module 121 to respective components of the wireless power reception unit 120. For example, the second power supply module 125 may supply power to the second signal reception module 123. The second power supply module 125 may supply power to the drive unit 130. The power that is supplied from the second power supply module 125 to the drive unit 130 may be controlled by the second control module 127.

The second control module 127 may control the second power supply module 125. For example, the second control module 127 may control the power that is output from the second power supply module 125 to the drive unit 130.

According to an embodiment, the second control module 127 may receive an output of the second signal reception module 123. When the second signal reception module 123 receives the power off signal, the second control module 127 may control the second power supply module 125 such that power that is supplied to the drive unit 130 is blocked. In addition, when the second signal reception module 123 receives the power on signal, the second control module 127 may control the second power supply module 125 such that power is supplied to the drive unit 130.

According to an embodiment, when the first signal reception module 113 and the second signal reception module 123 receive the power off signal, the first control module 117 of the wireless power transmission unit 110 may receive an output (e.g., the voltage $V_{C2}$ of the capacitor in the transmission resonator 111d), which exceeds a predetermined value, from the wireless power transmission module 111 (e.g., the transmission resonator 111d) as the power that is supplied to the drive unit 130 is being blocked by the second control module 127 of the wireless power reception module 120. As such, the first control module 117 may control the first power supply module 115 such that power that is supplied to the wireless power transmission module 111 is blocked.

Figure 3A:
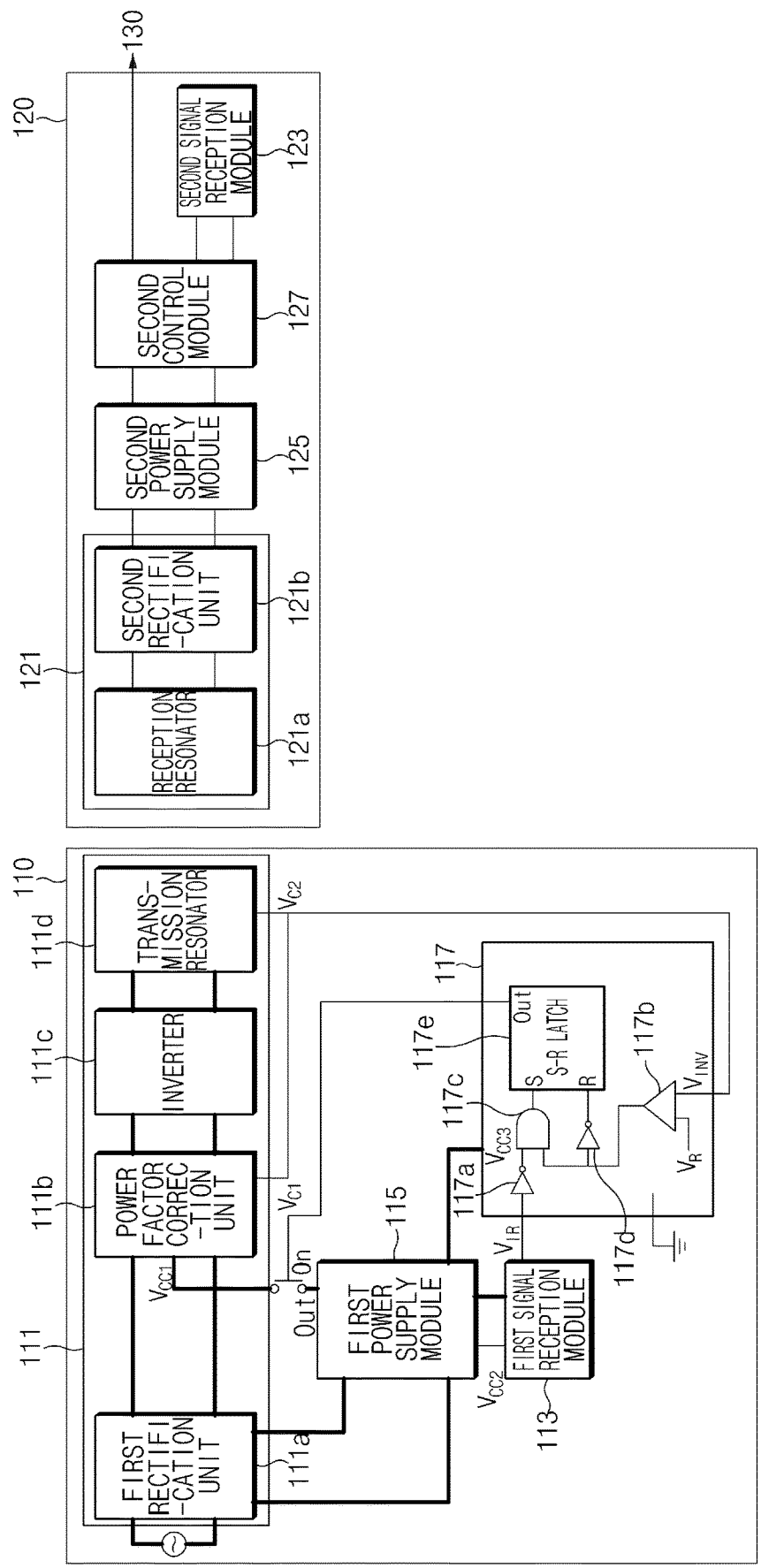

FIG. 3A is a block diagram illustrating a state in which an electronic apparatus according to an embodiment is turned on.

Referring to FIG. 3A, when the electronic apparatus 100 is turned on, an image may be displayed in the display by operating the drive unit 130.

When the electronic apparatus 100 is operating in an on state, the first control module 117 may control the first power supply module 115 such that power is supplied from the first power supply module 115 to the wireless power transmission module 111. For example, the first control module 117 may establish a connection for supplying the power $V_{CC1}$ from the first power supply module 115 to the power factor correction unit 111b of the wireless power transmission module 111. According to an embodiment, the first power supply module 115 may supply power to the first signal reception module 113 and the first control module 117.

According to an embodiment, since the first signal reception module 113 does not receive a control signal from the remote control apparatus 200, the first control module 117 may receive an output voltage $V_{IR}$ of a high level from the first signal reception module 113. Further, since the power factor correction unit 111b and the transmission resonator 111d of the wireless power transmission module 111 is in an operating state, the first control module 117 may receive, as an input voltage $V_{INV}$, output voltage $V_{C2}$, which is not greater than the predetermined voltage value $V_R$, from the wireless power transmission module 111. The first control module 117 may compare the input voltage $V_{INV}$ from the wireless power transmission module 111 with the predetermined voltage $V_R$ via the comparator 117b. The comparator 117b may output a signal of the high level when the output of the wireless power transmission module 111 is not greater than the predetermined voltage $V_R$ and may output a signal of the low level when the output of the wireless power transmission module 111 exceeds the predetermined voltage $V_R$. As such, the first control module 117 may output the high-level signal via the comparator 117b.

According to an embodiment, the S-R latch 117e of the first control module 117 may receive, via the "S" input, an output (or a low-level signal) of the AND gate 117c that receives an output of the first NOT gate 117a, to which an output of the first signal reception module 113 is input, and an output of the comparator 117b. The S-R latch 117e may receive, via the "R" input, an output (i.e., a low-level signal) of the second NOT gate 117d, to which the output of the comparator 117b is input. As such, the S-R latch 117e may maintain an output. For example, the first control module 117 may maintain a state in which a connection is established for supplying the power $V_{CC1}$ from the first power supply module 115 to the power factor correction unit 111$b$ of the wireless power transmission module 111.

In this case, the wireless power transmission module 111 may convert AC power supplied from a power source to DC power via the first rectification unit 111$a$, may correct the power factor of the converted DC power via the power factor correction unit 111$b$ in order to output a DC voltage, may convert the DC voltage to an AC voltage via the inverter 111$c$ in order to generate AC power, and may transmit the generated AC power to the wireless power reception unit 120 via the transmission resonator 111$d$.

When the electronic apparatus 100 is in the on state, the second control module 127 may enable power to be supplied from the second power supply module 125 to the drive unit 130. According to an embodiment, in the electronic apparatus 100, the second control module 127 may supply power transmitted from the wireless power transmission unit 110 to the second signal reception module 123. As such, the electronic apparatus 100 may receive a control signal (e.g., a power on signal) via the second signal reception module 123 and may operate the drive unit 130 in response to the control signal in order to display an image in the display.

Figure 3B:
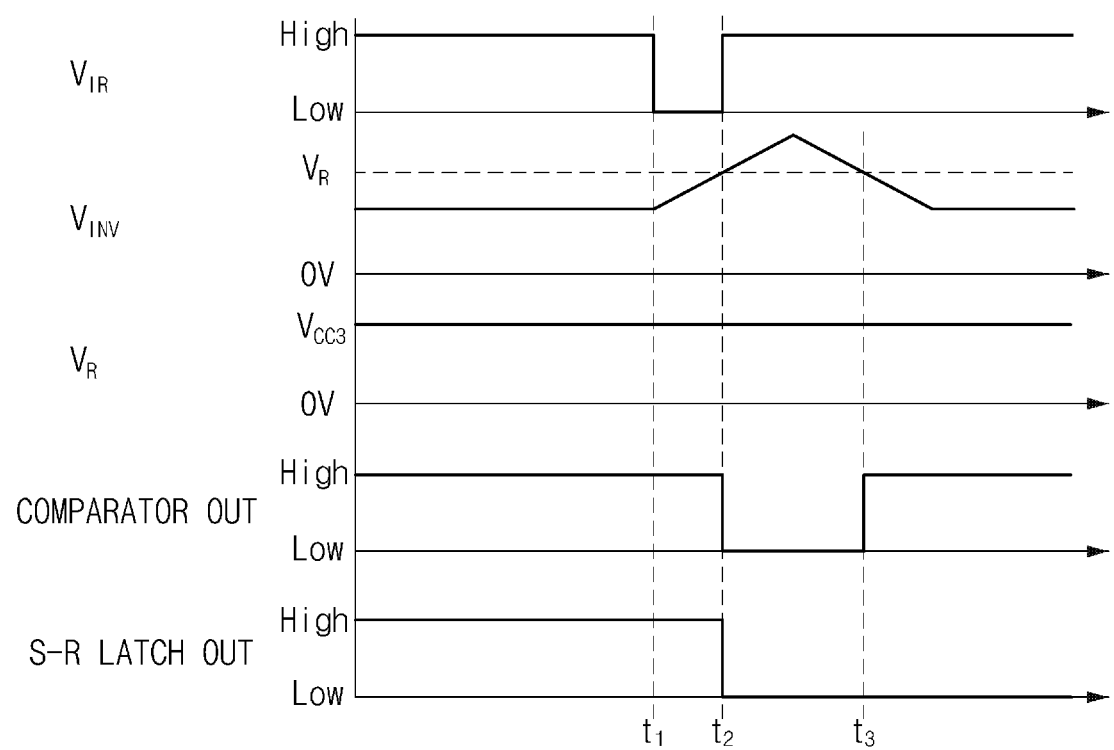
FIG. 3B illustrates an input or output value of each component of an electronic apparatus according to an embodiment when the electronic apparatus receives a power off signal while operating in an on state.

FIG. 3B illustrates an input or output value of each component of an electronic apparatus according to an embodiment when the electronic apparatus receives a power off signal in an on state.

Referring to FIG. 3B, the electronic apparatus 100 may receive a power off signal from the remote control apparatus 200 at a first time point $t_1$.

When the electronic apparatus 100 receives the power off signal, the first control module 117 may control the first power supply module 115 such that power that is supplied from the first power supply module 115 to the wireless power transmission module 111 is blocked.

According to an embodiment, when receiving the power off signal at the first time point $t_1$, the first signal reception module 113 of the wireless power transmission unit 110 may output the voltage $V_{IR}$ of the low level from the first time point $t_1$ to a second time point $t_2$. When receiving the power off signal, the second signal reception module 123 of the wireless power reception unit 120 may output a signal that corresponds to the power off signal to the second control module 127. The second control module 127 may control the second power supply module 125 to block power that is supplied to the drive unit 130. In the case where the drive unit 130 does not operate, since the load connected to the wireless power reception unit 120 decreases (or the load is light), an output of the wireless power transmission module 111 may increase. For example, the capacitor voltage $V_{C2}$ of the inverter 111$c$ in the wireless power transmission module 111 may increase. The voltage $V_{INV}$ input to the comparator 117$b$ may exceed the predetermined voltage value $V_R$ at the second time point $t_2$ due to the increase in the output of the wireless power transmission module 111. The comparator 117$b$ may output a low-level signal from the second time point $t_2$, at which the voltage $V_{INV}$ input to the comparator 117$b$ is not lower than the predetermined voltage $V_R$, to a third time point $t_3$.

The low-level signal of the AND gate 117$c$ may be input to the "S" input of the S-R latch 117$e$, and the high-level signal of the second NOT gate 117$d$ may be input to the "R" input of the S-R latch 117$e$. An output signal of the S-R latch 117$e$ may transition from the high level to the low level. As such, the wireless power transmission unit 110 may turn off some components (e.g., the power factor correction unit 111$b$, the inverter 111$c$, and the transmission resonator 111$d$) of the wireless power transmission module 111 that is configured for transmitting power to the wireless power reception unit 120.

In addition, when an overvoltage is applied to the wireless power transmission unit 110 due to an abnormal operation of the electronic apparatus 100, it may be possible to turn off the wireless power transmission unit 110. For example, when an overvoltage is applied to the wireless power transmission unit 110, the electronic apparatus 100 may turn off the wireless power transmission unit 110 as the capacitor voltage $V_{C1}$ of the power factor correction unit 111$b$ increases and thus the voltage $V_{INV}$ input to the comparator 117$b$ exceeds the predetermined voltage value $V_R$.

Figure 4A:
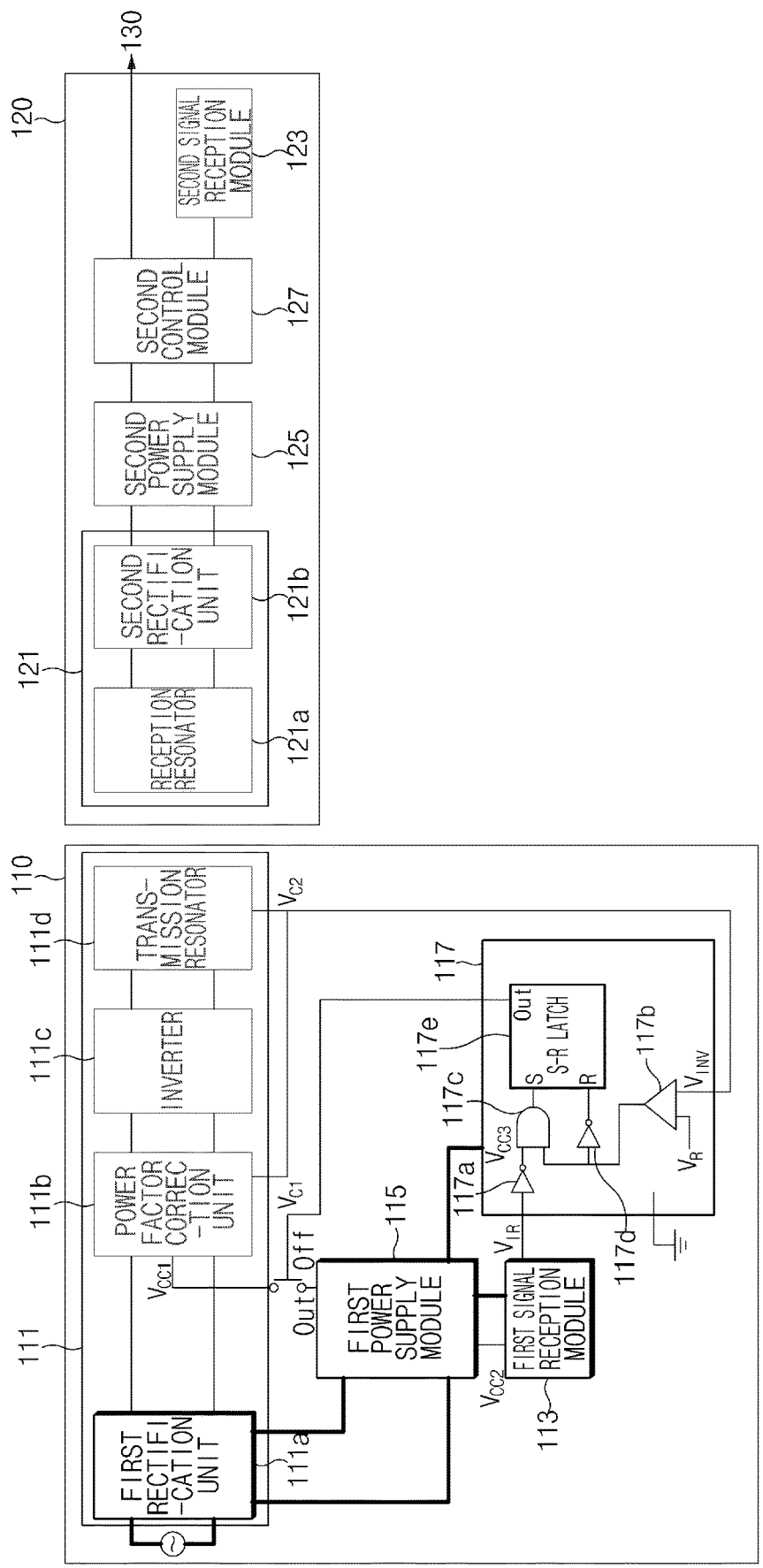
FIG. 4A is a block diagram illustrating a state in which an electronic apparatus according to an embodiment is turned off.

FIG. 4A is a block diagram illustrating a state in which an electronic apparatus according to an embodiment is turned off.

Referring to FIG. 4A, when the electronic apparatus 100 is in an off state (or in a standby state), the electronic apparatus 100 may operate only a signal reception module for the purpose of receiving a power on signal from the remote control apparatus 200.

When the electronic apparatus 100 is in the off state, the first control module 117 may control the first power supply module 115 such that power that is supplied from the first power supply module 115 to the wireless power transmission module 111 is blocked. For example, the first control module 117 may not establish the connection for supplying the power $V_{CC1}$ from the first power supply module 115 to the power factor correction unit 111$b$ of the wireless power transmission module 111. According to an embodiment, the first power supply module 115 may supply power to the first signal reception module 113 and the first control module 117 for the purposes of receiving a power on signal when the electronic apparatus 100 is in the off state and performing an operation that corresponds to the received signal.

According to an embodiment, since the first signal reception module 113 does not receive a control signal from the remote control apparatus 200, the first control module 117 may receive the output voltage $V_{IR}$ of the high level from the first signal reception module 113. Further, since the power factor correction unit 111$b$ and the transmission resonator 111$d$ of the wireless power transmission module 111 do not operate, the first control module 117 may receive, as the input voltage $V_{INV}$, an output voltage (e.g., 0 V), which is not greater than a predetermined voltage, from the wireless power transmission module 111. The first control module 117 may compare the input voltage $V_{INV}$ from the wireless power transmission module 111 with the predetermined voltage $V_R$ via the comparator 117$b$. As such, the first control module 117 may output the high-level signal via the comparator 117$b$.

According to an embodiment, the S-R latch 117$e$ of the first control module 117 may receive, via the "S" input, an output (or a low-level signal) of the AND gate 117$c$ that receives an output of the first NOT gate 117$a$, to which an output of the first signal reception module 113 is input, and an output of the comparator 117$b$. The S-R latch 117$e$ may receive, via the "R" input, an output (i.e., a low-level signal) of the second NOT gate 117$d$, to which the output of the comparator 117$b$ is input. As such, the S-R latch 117$e$ may maintain an output. For example, the first control module 117 may maintain a state in which no connection through which the power $V_{CC1}$ is supplied from the first power supply module 115 to the power factor correction unit 111*b* of the wireless power transmission module 111 is established.

As such, the wireless power transmission module 111 may not transmit power to the wireless power reception module 121 of the wireless power reception unit 120. Further, the second control module 127 cannot supply power to the drive unit 130, because no power is transmitted from the wireless power transmission unit 110.

Figure 4B:
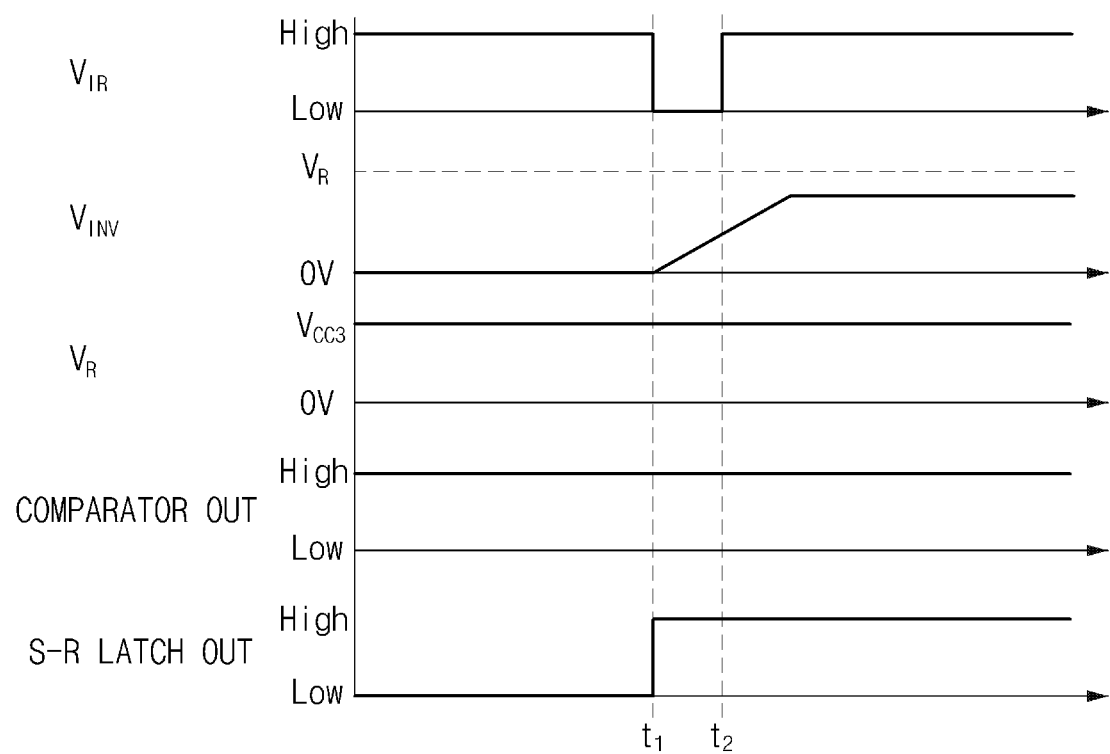
FIG. 4B illustrates an input or output value of each component of an electronic apparatus according to an embodiment when the electronic apparatus receives a power on signal while in an off state.

FIG. 4B illustrates an input or output value of each component of an electronic apparatus according to an embodiment when the electronic apparatus receives a power on signal in an off state.

Referring to FIG. 4B, the electronic apparatus 100 may receive a power on signal from the remote control apparatus 200 at a first time point $t_1$.

When the electronic apparatus 100 receives the power on signal, the first control module 117 may control the first power supply module 115 such that power is supplied from the first power supply module 115 to the wireless power transmission module 111.

According to an embodiment, when receiving the power on signal at the first time point $t_1$, the first signal reception module 113 of the wireless power transmission unit 110 may output the voltage $V_{IR}$ of the low level from the first time point $t_1$ to a second time point $t_2$. The comparator 117*b* may output a high-level signal because the voltage $V_{INV}$ input to the comparator 117*b* is not greater than the predetermined voltage $V_R$. The high-level signal of the AND gate 117*c* may be input to the "S" input of the S-R latch 117*e*, and the low-level signal of the second NOT gate 117*d* may be input to the "R" input of the S-R latch 117*e*. As such, an output signal of the S-R latch 117*e* may transition from the low level to the high level. According to an embodiment, even though the first signal reception module 113 outputs the high-level voltage $V_{IR}$ at the second time point $t_2$, the first control module 117 may maintain the on state of the electronic apparatus 100. For example, a low-level signal of the AND gate 117*c* may be input to the "S" input of the S-R latch 117*e*, and the low-level signal of the second NOT gate 117*d* may be input to the "R" input of the S-R latch 117*e*. As such, the S-R latch 117*e* may maintain the output signal at the high level.

Figure 5:
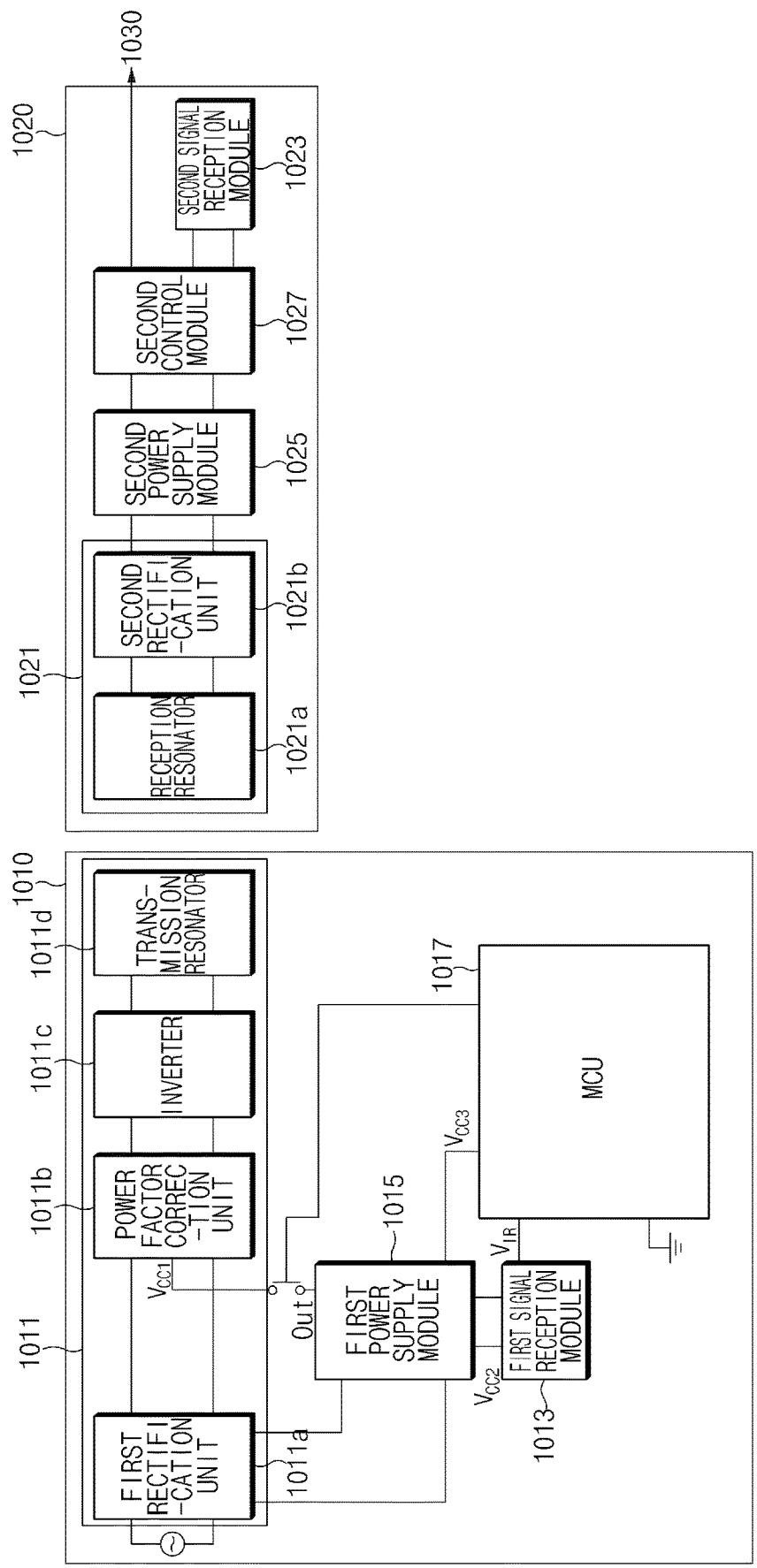
FIG. 5 is a block diagram illustrating a configuration in which a wireless power transmission unit of an electronic apparatus according to an embodiment includes a micro controller unit.

FIG. 5 is a block diagram illustrating a configuration in which a wireless power transmission unit of an electronic apparatus according to an embodiment includes a micro controller unit (MCU).

Referring to FIG. 5, an electronic apparatus 1000 may include a wireless power transmission unit (also referred to herein as a "wireless power transmitter") 1010, a wireless power reception unit (also referred to herein as a "wireless power receiver") 1020, and a drive unit (also referred to herein as a "drive module" or a "drive component") 1030. The electronic apparatus 1000 may be similar to the electronic apparatus 100 of FIG. 2. A difference between the electronic apparatus 1000 and the electronic apparatus 100 of FIG. 2 will be described below.

According to an embodiment, a first control module 1017 of the wireless power transmission unit 1010 may include a micro controller unit (MCU). The MCU may receive an output of a first signal reception module 1013, for example, as an input.

According to an embodiment, when the first signal reception module 1013 receives a power off signal, the first control module 1017 may control a first power supply module 1015 such that power that is supplied to a wireless power transmission module 1011 is blocked. For example, the first control module 1017 may establish a connection for supplying power from the first power supply module 1015 to a power factor correction unit 1011*b* of the wireless power transmission module 1011.

According to an embodiment, when the first signal reception module 1013 receives a power on signal, the first control module 1017 may control the first power supply module 1015 such that power is supplied to the wireless power transmission module 1011. For example, the first control module 1017 may establish the connection for supplying power from the first power supply module 1015 to the power factor correction unit 1011*b* of the wireless power transmission module 1011.

The electronic apparatus 100/1000 according to various embodiments of the present disclosure as described above with reference to FIGS. 1 to 5 may include the signal reception module 113/1013, which receives a control signal from the remote control apparatus 200, in the wireless power transmission unit 110/1010 as well as the wireless power reception unit 120/1020. The electronic apparatus 100/1000 may turn off some components of the wireless power transmission unit 110/1010 in an off state of the electronic apparatus 100/1000, thus reducing power consumption of an apparatus, which wirelessly transmits power supplied from an external power source to the drive unit 130/1030, in a standby state.

Further, when an overvoltage is applied to the wireless power transmission unit 110/1010, the wireless power reception unit 120/1020, and the drive unit 130/1030 due to an abnormal operation of the electronic apparatus 100/1000, the wireless power transmission unit 110/1010 may be turned off, thereby preventing the electronic apparatus 100/1000 from being out of order.

Figure 6:
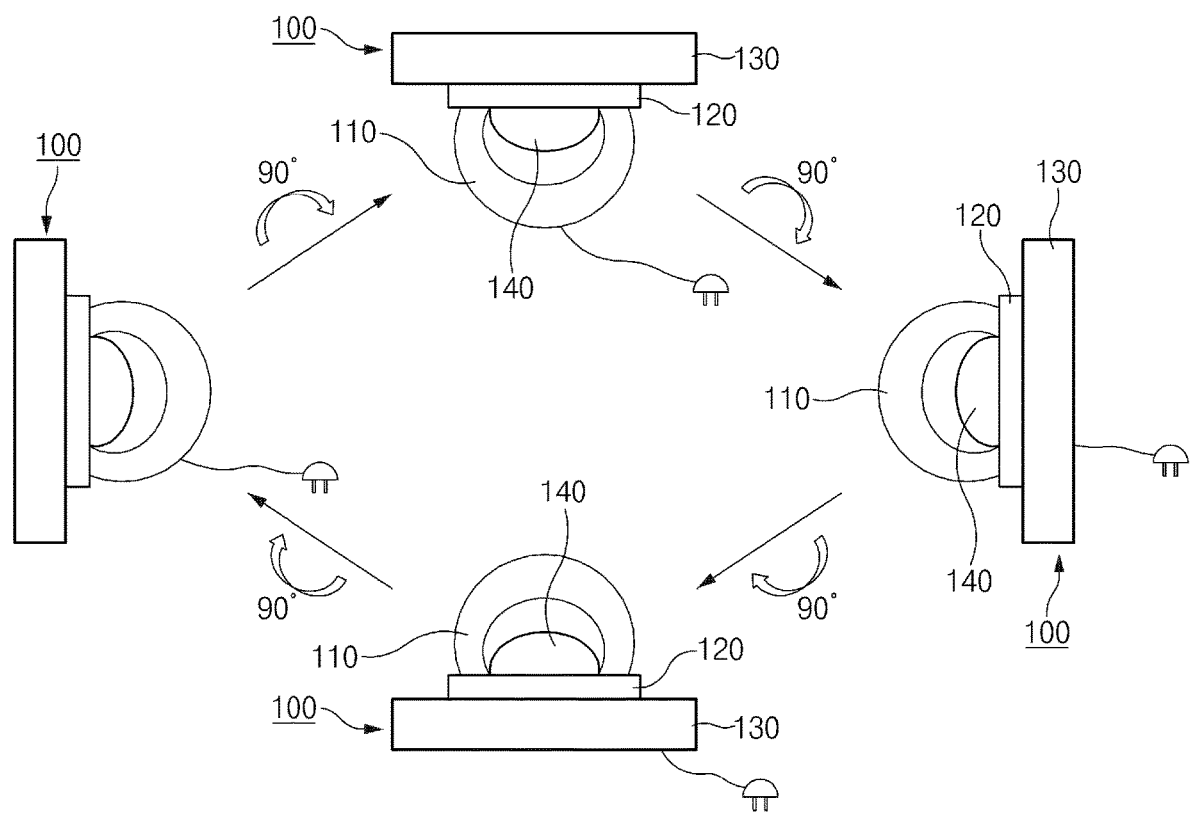
FIGS. 6 and 7 are views illustrating a rotation of a display connected with a wireless power reception unit and a drive unit, when an electronic apparatus according to an embodiment includes a stand.
Figure 7:
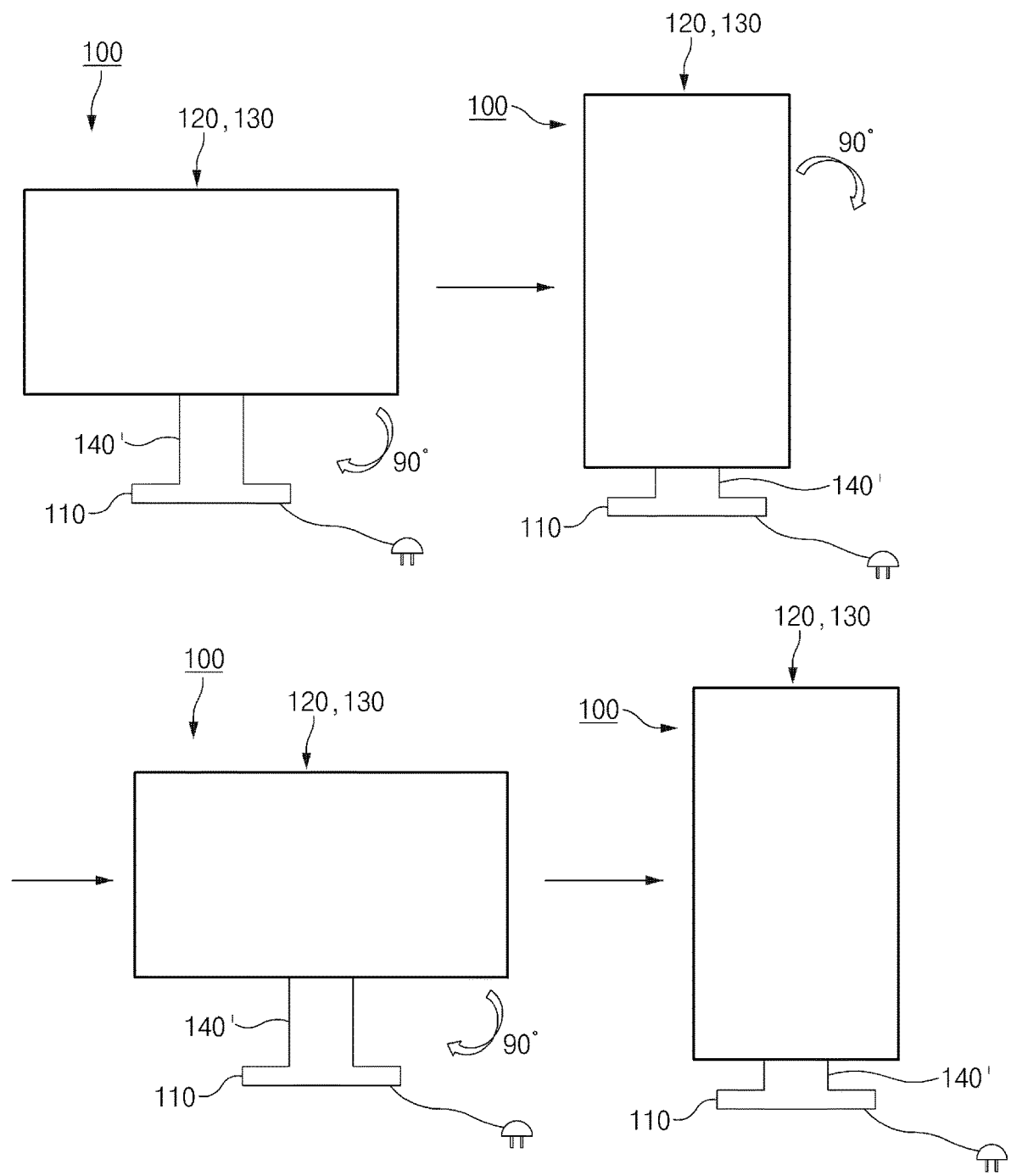

FIGS. 6 and 7 are views illustrating a rotation of a display connected with a wireless power reception unit and a drive unit, when an electronic apparatus according to an embodiment includes a stand.

Referring to FIGS. 6 and 7, the electronic apparatus 100 may include the wireless power transmission unit 110, the wireless power reception unit 120, and the drive unit 130, and may further include a stand 140 for fixing a display connected to the wireless power reception unit 120 and the drive unit 130.

The stand 140 may fix a position of the wireless power transmission unit 110, and the wireless power reception unit 120 and the drive unit 130. Referring to FIG. 6, the wireless power reception unit 120 and the drive unit 130 may rotate in a horizontal direction around the stand 140. Referring to FIG. 7, the wireless power reception unit 120 and the drive unit 130 may rotate in a vertical direction around a point connected with a stand 140'. Since the wireless power transmission unit 110 and the wireless power reception unit 120 are wirelessly connected to each other, the wireless power reception unit 120 and the drive unit 130 may continuously rotate in one direction without a limitation on a movement that would otherwise result from a wired connection.

Figure 8:
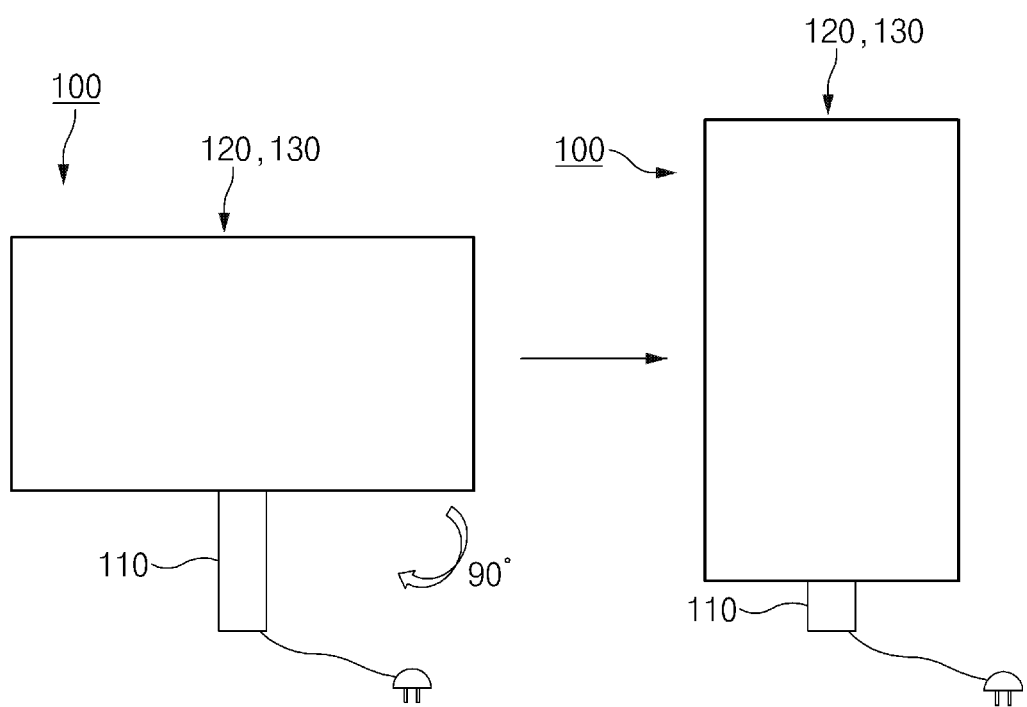
FIG. 8 is a view illustrating a rotation of a display connected with a wireless power reception unit and a drive unit, when an electronic apparatus according to an embodiment is wall-mounted.

FIG. 8 is a view illustrating a rotation of a display connected with a wireless power reception unit and a drive unit, when an electronic apparatus according to an embodiment is wall-mounted.

Referring to FIG. 8, the electronic apparatus 100 may be wall-mounted through the coupling of the wireless power reception unit 120 and the drive unit 130 with the wireless power transmission unit 110 in a state where the wireless power transmission unit 110 is fixed to a wall.

The wireless power reception unit 120 and the drive unit 130 may rotate in a vertical direction around a point at which the wireless power reception unit 120 and the drive unit 130 are connected to the wireless power reception unit 120. Since the wireless power transmission unit 110 and the wireless power reception unit 120 are wirelessly connected to each other, the wireless power reception unit 120 and the drive unit 130 may continuously rotate in one direction without a limitation on a movement that would otherwise result from a wired connection.

The display that is connected to the wireless power reception unit 120 and the drive unit 130 of the electronic apparatus 100 according to various embodiments of the present disclosure described with reference to FIGS. 6, 7 and 8 may freely rotate based on on the intention of a user.

At least a part of an apparatus (e.g., modules or functions thereof) or a method (e.g., operations) according to various embodiments may be implemented by instructions stored in a transitory or non-transitory computer-readable storage medium in the form of a program module. The instruction, when executed by a processor, may cause the processor to perform a function corresponding to the instruction. A non-transitory computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk), an embedded memory, and the like. The instruction may include a code made by a complier or a code executable by an interpreter.

While the present disclosure has been shown and described with reference to various embodiments thereof, it will be understood by persons having ordinary in the art that various changes in form and details may be made therein without departing from the spirit and scope of the present disclosure as defined by the appended claims and their equivalents.

What is claimed is:

1. A wireless system comprising:
    a display device comprising a wireless power reception apparatus;
    a remote control apparatus; and
    a wireless power transmission apparatus,
    wherein the wireless power transmission apparatus comprises:
        a wireless power transmission module configured to wirelessly transmit power to the wireless power reception apparatus, wherein the power is used for an operation of the display device;
        a first power supply module configured to supply power to the wireless power transmission module;
        a first signal reception module; and
        a first control module configured to control the first power supply module such that supply of power to the wireless power transmission module is blocked when the first signal reception module receives a power off signal from the remote control apparatus.

2. The wireless system of claim 1, wherein the display device further comprises:
    a second signal reception module;
    a second power supply module configured to supply the power wirelessly received via the wireless power reception apparatus;
    a driving apparatus configured to use the power from the second power supply module for the operation of the display device; and
    a second control module configured to control the second power supply module such that supply of the power to the driving apparatus is blocked, when the second signal reception module receives the power off signal from the remote control apparatus.

3. The wireless system of claim 2, wherein the second control module is further configured to:
    control the second power supply module to supply the power to the driving apparatus when the second signal reception module receives a power on signal from the remote control apparatus.

4. The wireless system of claim 1, wherein the first control module comprises an integrated circuit (IC) configured to receive an output of the wireless power transmission module.

5. The wireless system of claim 4, wherein the integrated circuit is configured to receive the output, of which a voltage value exceeds a predetermined value, from the wireless power transmission module when the first signal reception module receives the power off signal from the remote control apparatus.

6. The wireless system of claim 5, wherein the predetermined value corresponds to a voltage applied to the integrated circuit by the first power supply module.

7. The wireless system of claim 5, wherein the integrated circuit comprises a comparator configured to:
    output a signal of a high level when the output of the wireless power transmission module is not greater than the predetermined value; or
    output a signal of a low level when the output of the wireless power transmission module exceeds the predetermined value.

8. The wireless system of claim 7, wherein the integrated circuit further comprises:
    a first NOT gate configured to receive the output of the wireless power transmission module;
    an AND gate configured to receive an output of the first NOT gate and to receive an output of the comparator;
    a second NOT gate configured to receive the output of the comparator; and
    an S-R latch circuit configured to receive an output of the AND gate as an "S" input and to receive an output of the second NOT gate as an "R" input.

9. The wireless system of claim 1, wherein the first control module comprises a micro controller unit (MCU) configured to receive an output of the first signal reception module.

10. The wireless system of claim 9, wherein the MCU is configured to:
    receive a changed signal from the first signal reception module when the first signal reception module receives the power off signal from the remote control apparatus, and
    control the first power supply module such that the supply of the power to the wireless power transmission module is blocked.

11. The wireless system of claim 1, wherein the first control module is further configured to:
    control the first power supply module to supply the power to the wireless power transmission module when the first signal reception module receives a power on signal from the remote control apparatus.

12. A wireless power transmission apparatus comprising:
    a wireless power transmission module configured to wirelessly transmit power;
    a power supply module configured to supply power to the wireless power transmission module;
    a signal reception module; and a control module configured to control the power supply module such that supply of power to the wireless power transmission module is blocked when the signal reception module receives a power off signal from a remote control apparatus.

13. The wireless power transmission apparatus of claim 12, wherein the control module comprises an integrated circuit (IC) configured to receive an output of the wireless power transmission module.

14. The wireless power transmission apparatus of claim 13, wherein the integrated circuit is configured to receive the output, of which a voltage value exceeds a predetermined value, from the wireless power transmission module when the signal reception module receives the power off signal from the remote control apparatus.

15. The wireless power transmission apparatus of claim 14, wherein the predetermined value corresponds to a voltage applied to the integrated circuit by the power supply module.

16. The wireless power transmission apparatus of claim 14, wherein the integrated circuit comprises a comparator configured to:
output a signal of a high level when the output of the wireless power transmission module is not greater than the predetermined value; or
output a signal of a low level when the output of the wireless power transmission module exceeds the predetermined value.

17. The wireless power transmission apparatus of claim 16, wherein the integrated circuit further comprises:
a first NOT gate configured to receive the output of the wireless power transmission module;
an AND gate configured to receive an output of the first NOT gate and to receive an output of the comparator;
a second NOT gate configured to receive the output of the comparator; and
an S-R latch circuit configured to receive an output of the AND gate as an "S" input and to receive an output of the second NOT gate as an "R" input.

18. The wireless power transmission apparatus of claim 12, wherein the control module comprises a micro controller unit (MCU) configured to receive an output of the signal reception module.

19. The wireless power transmission apparatus of claim 18, wherein the MCU is configured to:
receive a changed signal from the signal reception module when the signal reception module receives the power off signal from the remote control apparatus, and control the power supply module such that the supply of the power to the wireless power transmission module is blocked.

20. The wireless power transmission apparatus of claim 12, wherein the control module is further configured to:
control the power supply module to supply the power to the wireless power transmission module when the signal reception module receives a power on signal from the remote control apparatus.

* * * * *